United States Patent [19]

Mowll

[11] Patent Number: 4,791,871

[45] Date of Patent: Dec. 20, 1988

[54] DUAL-MODE TRANSPORTATION SYSTEM

[76] Inventor: Jack U. Mowll, 3111 Furman La. #202, Alexandria, Va. 22306

[21] Appl. No.: 876,926

[22] Filed: Jun. 20, 1986

[51] Int. Cl.⁴ .............................................. B61B 3/00
[52] U.S. Cl. ...................................... 104/94; 104/88; 191/33 R; 180/65.5
[58] Field of Search ................... 180/65.5; 104/89, 94, 104/108, 88; 191/33 R

[56] References Cited

U.S. PATENT DOCUMENTS

| | | | |
|---|---|---|---|
| 3,023,825 | 3/1962 | Rabjohn | 180/65.5 X |
| 3,198,538 | 8/1965 | Nowell | 280/35 |
| 3,269,740 | 8/1966 | Hutchinson | 280/3 |
| 3,380,546 | 4/1968 | Rabjohn | 180/65.5 X |
| 3,495,260 | 2/1970 | Laughlin et al. | 343/112 |
| 3,521,771 | 7/1970 | Nowell et al. | 214/331 |
| 3,534,367 | 10/1970 | Laughlin et al. | 343/112 |
| 3,593,667 | 7/1971 | Morris | 104/120 |
| 3,647,239 | 3/1972 | Katsumori | 280/124 F |
| 3,720,422 | 3/1973 | Nelson | 280/35 |
| 3,747,957 | 7/1973 | Noll | 280/404 |
| 3,762,337 | 10/1973 | McKeon et al. | 105/159 |
| 3,788,232 | 1/1974 | Schneider et al. | 104/88 |
| 3,788,500 | 1/1974 | Lemelson | 214/41 |
| 3,790,779 | 2/1974 | Paddison | 246/182 C |
| 3,847,085 | 11/1974 | Rypinski | 104/122 |
| 3,861,315 | 1/1975 | Rypinski | 104/18 |
| 3,875,856 | 4/1975 | Meeker | 104/23 FS |
| 3,882,786 | 5/1975 | Woligrocki | 104/89 |
| 3,888,185 | 6/1975 | Walsh | 104/89 |
| 3,895,584 | 7/1975 | Paddison | 104/88 |
| 3,898,938 | 8/1975 | Poole | 105/215 C |
| 3,916,588 | 11/1975 | Magill | 52/30 |
| 3,973,504 | 10/1976 | Knudsen | 104/89 X |
| 4,015,539 | 4/1977 | Hamada | 104/130 |
| 4,018,410 | 4/1977 | Renaux | 246/5 |
| 4,023,753 | 5/1977 | Dobler | 246/5 |
| 4,050,597 | 9/1977 | Hawkins | 214/331 |
| 4,070,033 | 1/1978 | Weir et al. | 280/423 |
| 4,093,084 | 6/1978 | Ringer | 214/11 R |
| 4,266,482 | 5/1981 | Barber | 104/172 B |
| 4,335,986 | 6/1982 | Fahrner | 409/116 |
| 4,383,681 | 5/1983 | Walters | 269/17 |
| 4,416,571 | 11/1983 | Krause | 410/53 |
| 4,491,305 | 1/1985 | Walters | 269/17 |
| 4,522,546 | 6/1985 | Ringer | 414/343 |
| 4,574,707 | 3/1986 | Hickman | 105/159 |
| 4,576,098 | 3/1986 | Belanger et al. | 104/172 B |

OTHER PUBLICATIONS

Eisen, "Inventor Has Way to Fix Transit Ills", *Washington Post* (May 9, 1968) p. G6.
Brochure, "Sky Kar Corporation", Oct. 21, 1968.
Jay et al., "An Analog Study of Levapad Stability", Ford Motor Company, *ASME* (Oct. 30, 1958).
Haynes, "Sliding on Air", *SAE Annual Meeting*, Jan. 14, 1960.
Haynes et al., "Levacars—Why and How", *ASME Aviation Conference*, Jun. 5-9, 1960.

(List continued on next page.)

Primary Examiner—Joseph Falk
Attorney, Agent, or Firm—Joseph G. Seeber

[57] ABSTRACT

A dual-mode transportation system comprises a monotube guideway along which a dual-mode vehicle travels in a first mode of operation, the dual-mode vehicle having a second mode of operation in which it travels along a roadway. Each dual-mode vehicle carries its own four-wheel dolly for engaging the guideway as the vehicle travels along the guideway, the dolly being retractable so as to be stored in a recess in the roof of the vehicle. The dolly carries a flexible pick-up element which extends to an electric supply line in the guideway so as to receive and provide to the vehicle centrally generated power provided by the electric supply line. Power received by the vehicle during travel along the guideway is used not only to motivate the vehicle along the guideway but also to recharge a battery which powers the vehicle during conventional roadway travel. Preferably, the system is computer-controlled so as to maintain proper distance between and speed of vehicles, locate and identify disabled vehicles, properly route vehicles to their destination, and adjust vehicle speed based on fluctuation of system load. The duel-mode vehicle is, preferably, a three-wheel vehicle having a single driven rear wheel, capable of 360° rotation.

20 Claims, 8 Drawing Sheets

OTHER PUBLICATIONS

Jay et al., "Levacar Vehicles", Ford Motor Company (undated).

Brochure, "The Levacar" (undated)

Papault, "Le Proptotype Francais de Chemin de Fer Suspendu pour Transports Urbains et Suburbains", *Le Genie Civil* (Feb. 15, 1961).

Jay et al., "Levapads at High Speed", *American Society of Lubrication Engineers* (Apr. 1961).

"PM's Design–a–Body Contest—Win this Electric-Car Chassis ", *Popular Mechanics* (Aug. 1975), 46–47, 121–122.

Lindsley, "Turbine Electric Car Recharges the Batteries on the Run", *Popular Science* (Sep. 1975), 62–64.

Vinecour, "The Carof the Future . . . in Today's World", *Asia Magazine* Feb. 13, 1983), 8-8-13.

"Electric Cars—Will Sinclair Give or Get a Shock?", *The Economist* (Jun. 25, 1983), 66–67.

Brochure, "The Levacar . . . A New Concept of Travel" (undated).

"New Ideas from the Inventors", *Popular Science* (undated), 18.

FORWARD DIRECTION →

DUAL-MODE TRANSPORTATION SYSTEM

DESCRIPTION

1. Technical Field

The present invention relates to a dual-mode transportation system and more particularly a transportation system comprising a guideway along which dual-mode vehicles travel in a first mode of operation, the dual-mode vehicles having a second mode of operation in which they travel along conventional roadways.

2. Background Art

Present-day transportation systems are burdened by many disadvantages. For example, conventional roadways systems, such as the interstate highway system, are characterized by the disadvantages of lack of safety, severe traffic jams, inefficient use of energy resources, and excessive pre-emption of valuable land area. Of course, this is due to the fact that the conventional roadways are traveled by independently owned and driven vehicles operating at speeds which are determined solely by the judgment or desire of the driver. Each vehicle is powered by gasoline or diesel engines, resulting in a substantial drain on energy resources.

Attempts to overcome some of these disadvantages have resulted in the development of various mass-transit systems in which trains or vehicles travel on a fixed rail system, either underground, on the ground or overhead, and thus transport large numbers of people from one fixed station to another. Such systems suffer the disadvantage of inflexibility so that they do not serve the needs of a dispersed population. In addition, many people choose not to travel on such mass-transit systems based on a desire not to surrender their independence and privacy by submitting to travel in close proximity to large numbers of fellow-travelers on a system which locks them into a predetermined trip schedule. Such people prefer their own private passenger vehicle, regardless of the cost of owning and maintaining it.

When it comes to moving freight on the conventional roadway system, the same problems apply. Thus, attempts to develop mass transit systems for transporting freight have also been made. For quite some time, companies have shipped freight in railroad cars specifically constructed for that purpose, and more modern system designers have envisioned "pod" or "container" systems wherein freight to be shipped is loaded into its own pod, and such pods are transported by railroad systems, mono-rail systems, or other similar systems. A problem which is characteristic of such systems resides in the fact that unused pods or freight cars, or pods or freight cars loaded but waiting for transport, must be stored somewhere, resulting in over-crowding of storage facilities serving the system. Moreover, pods or freight cars not in use must also be stored, and in some cases must even be moved while empty from one location to another in order to meet the shipping requirements at the remote location.

Returning to a consideration of more modern forms of mass transit, various monorail systems and suspended vehicle systems have been proposed for transporting large numbers of people from one point to another. However, such systems still have disadvantages in that heavy cars are required for transporting large numbers of people, the heavy load of people being transported causes safety problems which would otherwise not be experienced, and such systems are often more expensive than anticipated because of the need to construct heavy-duty passenger cars and heavy-duty rail systems with sufficient support structures. Moreover, as previously mentioned, from the passenger's standpoint, such mass transit systems do not afford the independence which many passengers desire and even require.

In an effort to strike a compromise between mass transit systems for passengers and freight, on the one hand, and the desire for independent conveyance of passengers and freight to remote locations not served by the mass transit system, various dual-mode transportation systems have been proposed. For example, U.S. Pat. Nos. 3,861,315 and 3,847,085 of Rypinski disclose a dual-mode transportation system in which an overland vehicle, such as a minibus, is transported along part of its journey on an overhead track with the aid of a motor module riding along the track, which motor module carries a platform having jaws which grip the top of the minibus suspended above the surface of the ground. The vehicle is powered by a storage battery so that, when the destination station is reached, the minibus can continue its journey by conventional roadway powered by the storage battery. However, the Rypinski system is burdened by several disadvantages.

First, the system operates with a fixed number of carrying platforms so that one of two situations usually occurs; either the platforms are not all in use so that many vacant platforms must be transported along the system and take up needed space in the flow of traffic, or there are not enough platforms to handle the minibuses or vehicles designed to travel on the system and bottlenecks or traffic jams can easily result. Second, as mentioned previously, systems which convey large vehicles carrying many passengers are often very costly to construct and very limited in their mode of operation due to the need to pay strict attention to stringent safety factors, such safety factors being necessitated by the large load (both passengers and freight) imposed on the vehicles traveling such systems. Third, such mass transit systems usually are quite inflexible in that there is a minimum amount of switching from one route to another in the course of a vehicle's travel along the system.

In the course of developing systems providing a trade off between mass transit systems and conventional roadway systems, various dual-mode vehicles have been developed, such as those in the following U.S. Pat. Nos.: 3,593,667; 3,598,938; 4,416,571; and 4,574,707. However, such dual-mode vehicles as are disclosed in these patents operate either on the road or on rail tracks, and thus are not of the type which can take advantage of overhead and suspended rail systems.

Other dual-mode transportation systems for passengers or freight, or both, are disclosed in the following U.S. Pat. Nos.: 3,875,856; 3,916,588; 4,015,539; 4,093,084; and 4,522,546.

Various generic transport systems or methods, or various vehicle control systems or methods, are disclosed in the following U.S. Pat. Nos.: 3,788,232; 3,790,779; 3,895,584; 4,018,410; 4,023,753; 3,495,260; 3,534,367; and 3,788,500.

Finally, the following patents disclose dolly-type devices which are used for various vehicle conveyance functions, but which are only of background information relative to the present invention: U.S. Pat. Nos. 3,198,538; 3,269,740; 3,521,771; 3,647,239; 3,720,422; 3,747,957; 3,762,337; 4,050,597; 4,070,033; 4,266,482; 4,335,986; 4,383,6S1; 4,491,305; and 4,576,098.

DISCLOSURE OF INVENTION

The present invention relates to a dual-mode transportation system and to the vehicles associated therewith, the dual-mode transportation system being a general transport system designed to supplement, and eventually replace, the conventional roadway system traveled by automobiles, trucks and tractor trailers. In the dual-mode system of the present invention, which is computer-controlled, vehicles capable of operating at high speeds travel under computer control on an all-weather, all-electric, monotube guideway, and travel on conventional roadways as well. Features of the dual-mode transportation system include: (1) the dolly-monotube design; (2) the dual-mode vehicle design, including the provision of each dual-mode vehicle with, among other features, its own dolly for engaging the monotube when traveling along the monotube guideway; and (3) the computer-controlled system operation.

The monotube design of the system guideway provides for quick and safe travel of the lightweight dual-mode vehicles along the system. The monotube guideway design is such that the interior surface or flanged portions of the monotube, along which vehicle dolly wheels travel, are maintained in a weather-proof and dust-proof condition. Relative isolation of the interior surface of the monotube from weather and dust renders that surface highly suitable for travel by means of dollies equipped with fiberglass wheels with high traction. Thus, the system achieves the advantages of rubber tires (i.e., traction) without the disadvantages of wearing and puncture, both of the latter features posing potential safety problems on conventional roadway systems.

In accordance with the present invention, each vehicle consists of a lightweight vehicle carrying three or four passengers. The use of such lightweight vehicles makes it possible to use the previously discussed monotube design for the guideway, this being in contrast to various prior art systems, such as the Rypinski system, wherein heavyduty rail systems with special support elements and specially constructed vehicle carriers which travel along the rail system must be incorporated into the system.

Moreover, in accordance with the present invention, each vehicle carries its own portable dolly by means of which the vehicle is engaged to the monotube for travel along the system. As a result of the use of a portable dolly associated with each vehicle, the previous disadvantages resulting from the presence of too many extra carriers or too few carriers are not experienced by the system of the present invention. Of course, the provision of portable dollies associated with the vehicles in prior art systems is not possible since the vehicles being transported on prior art systems are quite heavy and typically carry large numbers of people or heavy freight loads. Further advantages of the "portable dolly" concept of the present invention include the ease with which computer-controlled switching can be achieved in such a system, and the ease with which vehicles can be integrated into the traffic stream.

In the system of the present invention, power is generated by a central power source, the power being carried by an electric supply line located inside the monotube. Each dolly has a pickup assembly mounted thereon, and it is through this element that power is conveyed from the monotube to the vehicle. As a result, the speed of each vehicle is centrally controlled so that traffic flows smoothly throughout the system, and this has obvious advantages with regard to safety. In addition, while traveling on the system, each vehicle receives charging power from the electric supply line so as to recharge its battery, thus readying the vehicle for travel on conventional roadways once it reaches its destination on the system.

Further advantages of the system include the following: (1) provision of a totally pollution-free, environmentally-compatible transport system; (2) provision of additional traffic capacity in the total transport system with minimal land acquisition and destruction or preemption of natural resources; (3) optimum quality of service to an expanding, highly dispersed pattern of land use characteristic of modern development; and (4) provision by the system of a high-speed, all-weather, fully automated, door-to-door service for long trips (such as those of about four miles or greater), plus total flexibility for shorter trips.

Therefore, it is a primary object of the present invention to provide a dual-mode transportation system.

It is an additional object of the present invention to provide a transportation system wherein vehicles are capable of operating at high speeds on an all-weather, all-electric, monotube guideway, and of operating on conventional roadways as well.

It is an additional object of the present invention to provide a transportation system on which dual-mode vehicles operate, each dual-mode vehicle being equipped with its own portable dolly for engaging the monotube of the system for travel along the system.

It is an additional object of the present invention to provide a transportation system wherein dual-mode vehicles of lightweight and carrying three or four passengers travel along a monotube guideway of the system.

It is an additional object of the present invention to provide a transportation system wherein mail or freight transport vehicles travel along the system, each mail or freight transport vehicle having its own dolly for engaging a monotube guideway of the system.

It is an additional object of the present invention to provide a transportation system which is centrally powered, each passenger vehicle traveling along the system receiving power from the central source for the purposes both of being conveyed along the system from an origin to a destination and of receiving battery recharging power so that the conventional roadways once the destination is reached.

It is an additional object of the present invention to provide a transportation system which is computer-controlled so that vehicles travel along the system at the highest safe speed, with proper distances being maintained between vehicles traveling the system at all times.

The above and other objects that will hereinafter appear, and the nature of the invention, will be more fully understood by reference to the following detailed description, the associated drawings, and the appended claims.

BEST MODE FOR CARRYING OUT THE INVENTION

The invention will now be more fully described with reference to the various figures of the drawings.

Figure 1A:
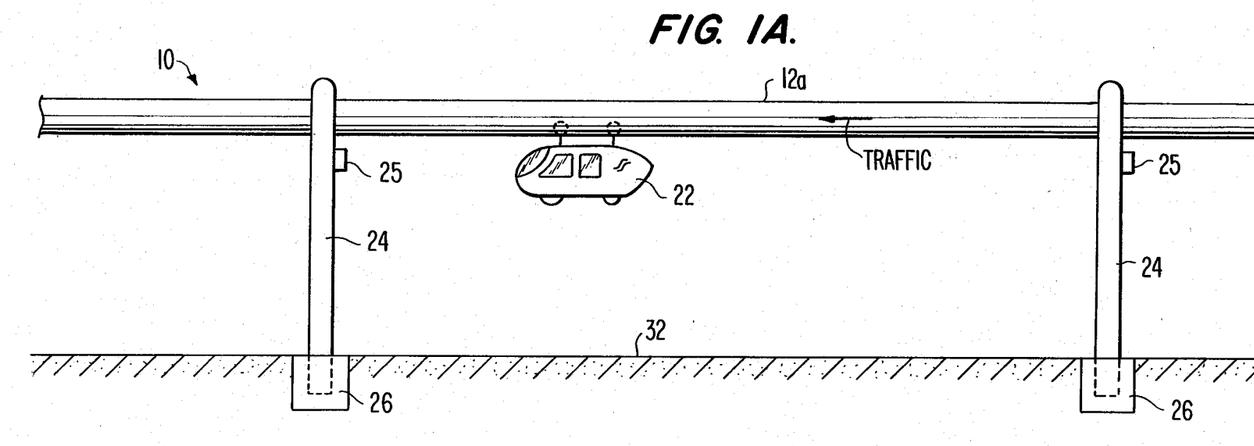
FIG. 1A is a side view of a portion of the transportation system of the present invention.
Figure 1B:
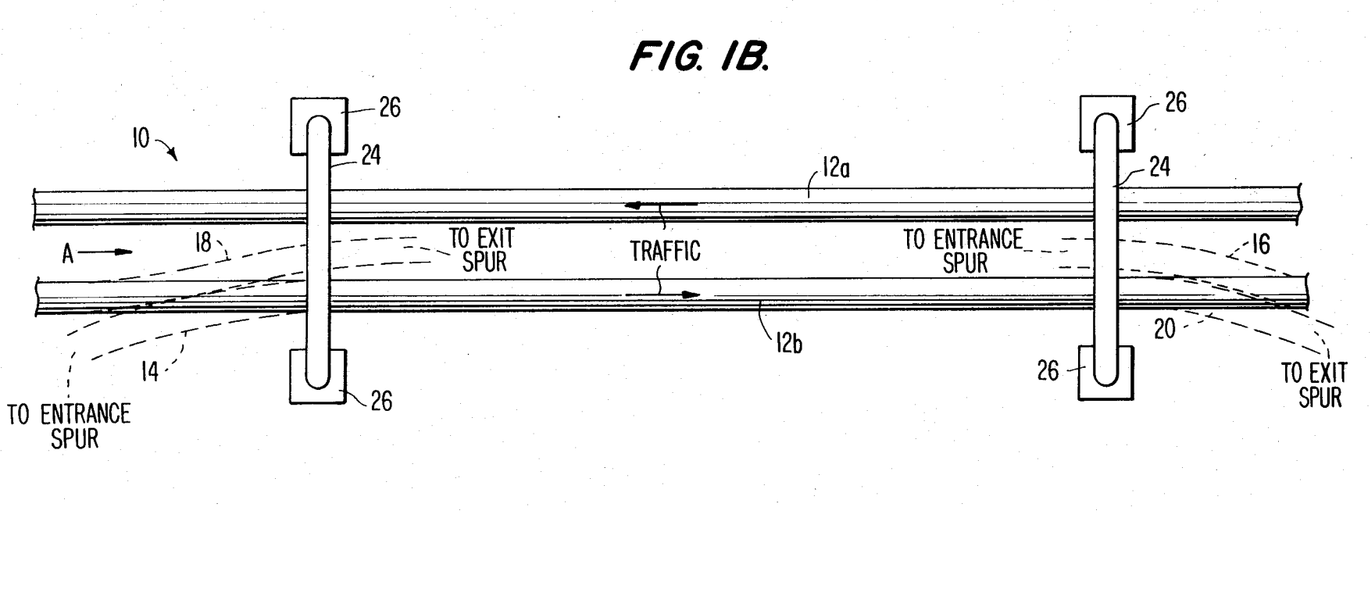
FIG. 1B is a top view of one portion of the transportation system of the present invention.
Figure 2:
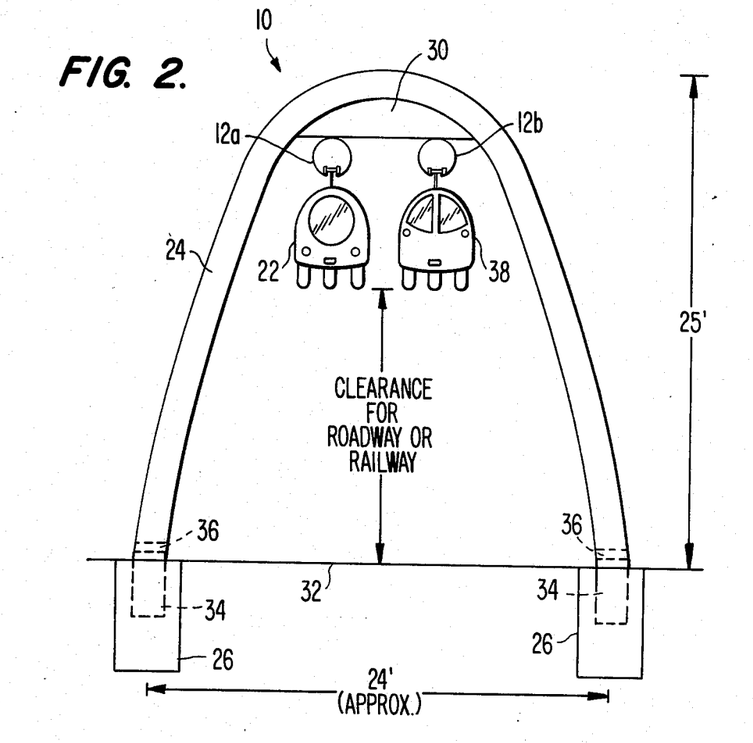
FIG. 2 is a front view of a portion of the transportation system of the present invention.

FIGS. 1A, 1B and 2 are a side view, a top view and a front view, respectively, of a portion 10 of the dual-mode transportation system. Specifically, FIG. 1B shows a top view of monotubes 12a and 12b for carrying traffic in opposite directions, as shown, while FIG. 2 is a front view (taken in the direction of the arrow A in FIG. 1B) of the portion 10 of the dual-mode transportation system. FIG. 1A is a side view of a monotube 12a carrying a vehicle 22 in the direction shown.

In general, the dual-mode transportation system of the present invention is a general transport system designed to supplement, and eventually replace, the auto-/truck/roadway system used in the present day. Vehicles operating on the dual-mode system in accordance with the present invention are capable of operating at high speeds under automatic control on an all-weather, all-electric, monotube guideway, as well as on conventional roadways.

The vehicle 22 in FIG. 1A is a lightweight electric car capable of carrying three or four passengers, and will be discussed in more detail below with reference to FIG. 3A. It should be understood that the dual-mode transportation system can also accommodate mail or freight modules or vehicles capable of carrying payloads of up to about one ton.

The monotube guideway of the system consists of monotubes 12a and 12b (see FIGS. 1B and 2) suspended in the air space over existing roadways, median strips, railways, utility rights-of-way, and otherwise unusable or uneven terrain. No grading of the land is necessary to build the system disclosed herein. In FIG. 2, reference numeral 32 designates the pavement or track level underneath the monotube guideway.

The dual-mode transportation system of the present invention is designed to provide the following: (1) additional traffic capacity with respect to that provided by existing roadway systems, such additional traffic capacity being provided at minimal capital expenditure; (2) high-speed, all-weather, fully automated, door-to-door service for long trips (of more than four miles), plus total flexibility for shorter trips; (3) optimum quality of service to expanding, highly dispersed patterns of land use characteristic of modern development; (4) additional traffic capacity to the total transport system with minimal land acquisition and destruction or preemption of natural resources; (5) a totally pollution-free, environmentally compatible transport system; and (6) the highest degree of safety obtainable in any modern transport system.

Monotubes 12a and 12b are held in position, suspended above the roadway or railway, by tapered tubular arches 24, preferably made of steel. As best seen in FIG. 2, each arch 24 is slip-fitted, at its end portions 36, with a steel sleeve 34, the steel sleeve 34 being embedded in a concrete foundation 26. The provision of a slip fitting provides the capability of vertically adjusting the arches 24 as they are positioned over the roadway or railway 32, thus providing flexibility in the installation of the arches 24. Each of the arches 24 is also provided with a plate 30, located at the apex of the arch 24, the plate 30 permitting horizontal adjustment of the monotubes 12a and 12b with respect to each other, thus providing further flexibility in the installation of the arches 24.

In FIG. 1B, dotted lines indicate the positions of the monotube 12b during switching of vehicles from the main spur to exit spurs or from entrance spurs to the main spur (monotube 12b). More specifically, switching of vehicles onto the main monotube 12b is accomplished by bending the monotube 12b in the manner indicated by reference numerals 14 and 16 so that the main spur is connected to an entrance spur; similarly, switching of vehicles onto exit spurs is accomplished by bending the monotube in the manner indicated by reference numerals 18 and 20 so that the main spur is connected to an exit spur. Such bending is accomplished by mechanical, hydraulic, magnetic or other conventional means. The distance of travel of the end of the monotube 12b being bent is merely equal to the diameter of the tube, the exit and entrance spurs being positioned in proximity to the main spur so that the distance of monotube bending is minimized when switching occurs.

Preferably, monotubes 12a and 12b are supported by arches 24, as shown in FIGS. 1A, 1B and 2 and as previously discussed. However, the monotubes 12a and 12b can be supported by other means, for example, cantilever bridges or suspension cables, depending on the terrain and the distances to be spanned. Furthermore, stations for providing on-off services for vehicles traveling along the main monotubes 12a and 12b are, preferably, located at appropriate intervals along the monotube lines. Within urban areas or for other specific needs, the stations may be located within buildings or parking garages, with the entry and exit monotubes located at any appropriate height above the surface so as to eliminate surface travel and avoid surface roadway congestion. Links between stations and the main monotubes 12a and 12b are accomplished by bending of the main monotubes 12a and 12b during switching, as describe above with respect to FIG. 1B (the dotted line portions thereof). Preferably, vehicles leaving the main line of traffic via the exit spurs 18 and 20 will enter deceleration monotubes on their approach to the stations, and similarly vehicles leaving the stations will use acceleration tubes prior to arriving at the switching point, that is, the bent main monotubes 12a and 12b.

Figure 3A:
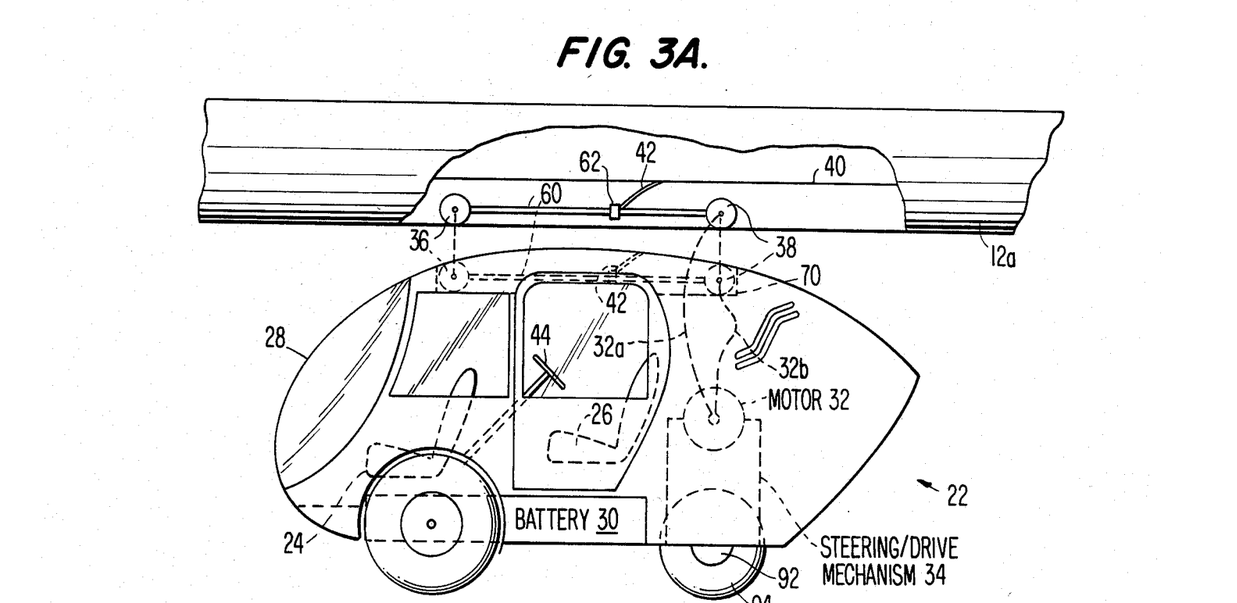
FIG. 3A is a side view of a dual-mode vehicle for use on the transportation system of the present invention.
Figure 3B:
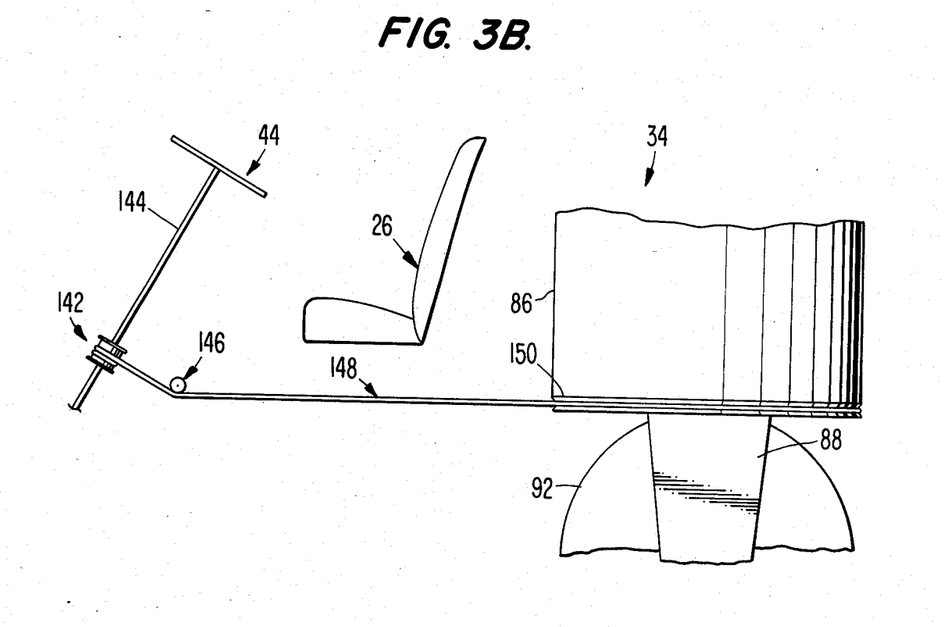
FIG. 3B is a side view of the steering system of the dual-mode vehicle.
Figure 4:
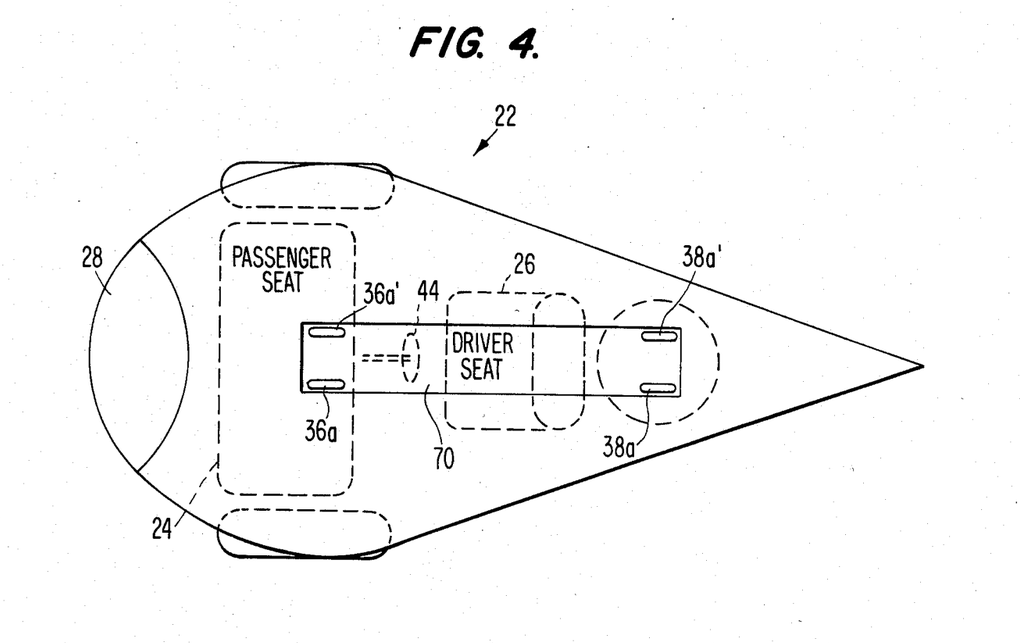
FIG. 4 is a top view of the dual-mode vehicle of FIG. 3A.

FIG. 3A is a side view of a dual-mode vehicle for use on the system, FIG. 3B is a side view of the steering system of the dual-mode vehicle, and FIG. 4 is a top view of the vehicle. Major elements of the vehicle 22 include the following: a passenger seat 24, a driver seat 26, a transparent front door 28, a battery 30, a motor 32, a steering/drive mechanism 34, and dolly wheels 36 and 38, shown in both their lower or retracted position (dotted lines) and their upper or extended position (solid lines). It is to be understood that, whereas FIGS. 3A and 4 and the associated description below deal with a dual-mode passenger vehicle for use on the inventive system, the basic principle of operation of the passenger vehicle in its "monotube" mode of operation applies equally to the operation of single-mode mail or freight modules which can travel on the inventive system. Thus, the description herein applies to the freight modules, except for that portion of the description dealing with recharging of the batteries, battery operation on roadways, reversible steering and passenger carrying.

When used on roadways, the vehicle 22 is battery-powered; when used on the guideway system, the vehicle 22 is powered by centrally generated electric power, such centrally generated electric power being transmitted to the vehicle 22 via the electric supply line 40 located in the monotube 12a. As will be discussed below, power from the electric supply line 40 is conveyed to the vehicle 22 via pick-up assembly 42, pick-up shoe or sleeve assembly 62 and internal cables (not shown).

During operation on the guideway, the battery 30 of the vehicle 22 is recharged as a result of the reception of the centrally generated power, but further battery charging can, of course, be carried out at home, at the work place, or even at shopping parking places, as envisioned by the present invention. In contrast to the passenger vehicles, freight modules are powered only by the centrally generated power, provided via the electric supply line 40 and pick-up assembly 42, such freight modules having no roadway capability.

Figure 5:
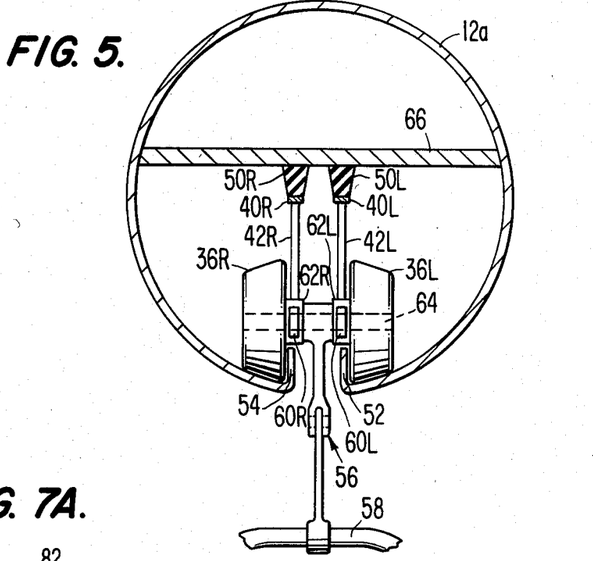
FIG. 5 is a detailed view of a portion of the dolly of the dual-mode vehicle as it engages the monotube guideway of the system of the present invention.

FIG. 5 is a detailed front view of the dolly wheels and dolly mechanism in their extended positions as the vehicle moves along the monotube guideway. As previously explained, with reference to FIG. 3A, the dolly wheels 36 and 38 are in a retracted position when the vehicle 22 is in a "roadway" mode of operation, but are in an extended position within the monotube 12a when the vehicle is in the "monotube" mode of operation. Thus, in the "roadway" mode of operation, wheels 36 and 39—which are connected by a longitudinal beam assembly 60 for longitudinal stability—lie within a recess 70 in the roof of the vehicle 22 (see FIGS. 3A and 4). At this point, a hinged strut 56 (see FIG. 5) connecting longitudinal beam assembly 60, front wheels 36 and rear wheels 38 to a frame member 58 of the vehicle 22 is in a collapsed position within the recess 70 of the vehicle 22 (FIG. 3A).

When the vehicle 22 is to enter the "monotube" mode of operation, the vehicle operator raises the dolly mechanism to its extended position; preferably, this is achieved by means of a hand crank and associated mechanical mechanism for raising the dolly mechanism to its extended position. As seen in FIG. 3A, once the dolly mechanism is in its extended position, the wheels 36 and 38 can enter the monotube 12a. At the same time, the pick-up assembly 42 mounted, via a pick-up shoe or sleeve assembly 62, on the longitudinal beam assembly 60 is moved into position so that it contacts the electric supply line 40 located in the monotube 12a.

Referring to the more detailed illustration in FIG. 5, in the "monotube" mode of operation, front wheels 36L and 36R are positioned in respective flanged portions 52 and 54 of the monotube 12a and, during powered operation of the vehicle, wheels 36L and 36R move along the flanged portions 52 and 54, respectively, of the monotube 12a. The vehicle 22 is suspended from the longitudinal beam assembly 60 (FIG. 3A) by means of the strut 56 in its extended position, the strut 56 serving to connect the longitudinal beam assembly 60 to a frame member 58 of the vehicle 22. Preferably, the frame member 58 is a "rollbar" type structure or "wishbone" type member which extends down the left and right sides of the vehicle, and which is connected to a bottom frame member of the vehicle (not shown).

Further referring to FIG. 5, the front wheels 36L and 36R are connected, via their common axle 64, to end portions of corresponding longitudinal beams 60L and 60R, respectively, the beams 60L and 60R making up the longitudinal beam assembly 60. The longitudinal beams 60L and 60R extend along the length of the guideway 12a (FIG. 3A) to the rear of the dolly mechanism, and are similarly connected, via the rear common axle, to the left and right rear wheels (shown generally by reference numeral 38 in FIG. 3A).

As further seen in FIG. 5, at some point in the length of the longitudinal beams 60L and 60R (preferably, at a midpoint in the length of these beams), pick-up shoes or sleeves 62L and 62R are positioned, and respective pick-up arms 42L and 42R extend from the pick-up shoes 62L and 62R to electric supply lines 40L and 40R, respectively. Supply lines 40L and 40R carry positive and negative electricity, respectively, and are connected, via respective insulators 50L and 50R, to a catenary support 66 positioned inside the monotube 12a, the support 66 providing lateral support to the monotube 12a.

During operation of the vehicle 22 in the "monotube" mode of operation, the four wheels 36, 38 of the dolly are powered by a flexible cable drive from the motor 32 (FIG. 3A) of the vehicle 22. In FIG. 3A, the dotted line 32a indicates one of the flexible cables extending from motor 32 to rear dolly wheels 38 in their extended position, while dotted line 32b indicates one of the flexible cables extending from the motor 32 to rear dolly wheels 38 in their retracted position. As indicated earlier, the motor 32 derives its power from the system's central power generator 122 (shown in FIG. 8), power generated by the central power generator 122 being transmitted to the vehicles on the system via the electric supply line 40 and pick-up assembly 42. It is to be understood that any flexible pick-up wire or similar device can be utilized to implement the function of assembly 42.

Figure 6:
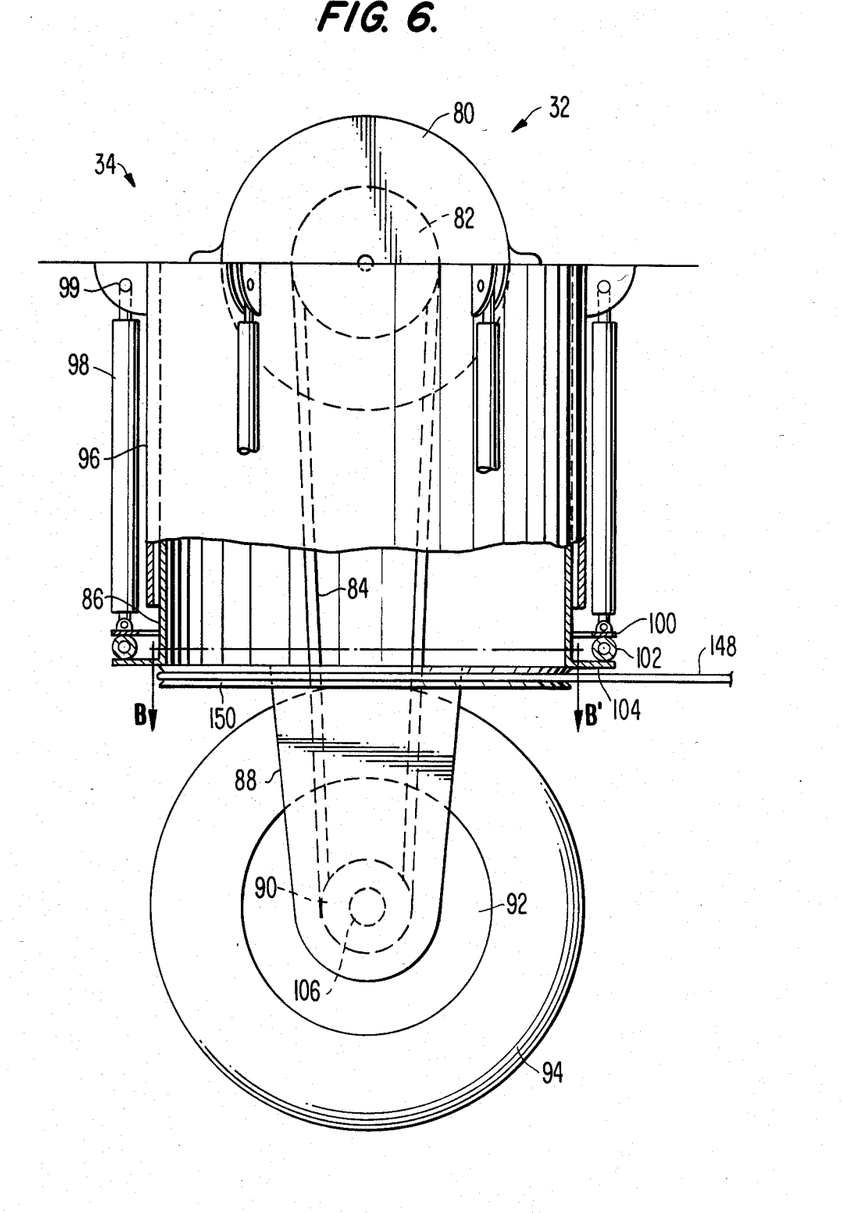
FIG. 6 is a side view of the steering/drive mechanism of the dual-mode vehicle of FIG. 3A.
Figure 7A:
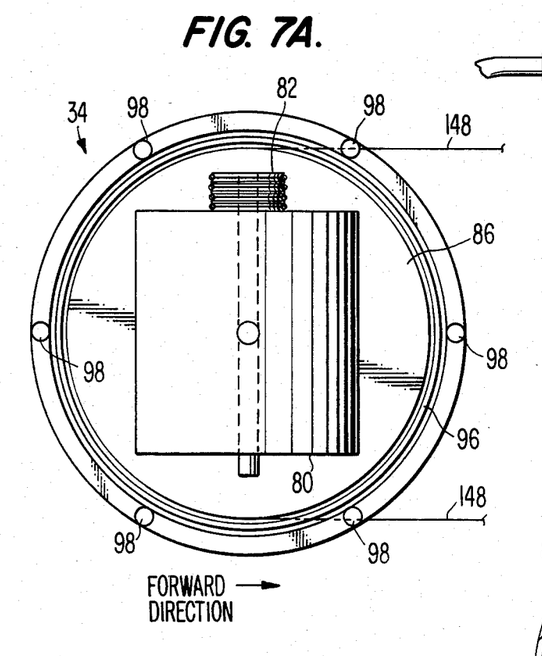
FIG. 7A is a top view of the steering/drive mechanism of the dual-mode vehicle of FIG. 3A.
Figure 7B:
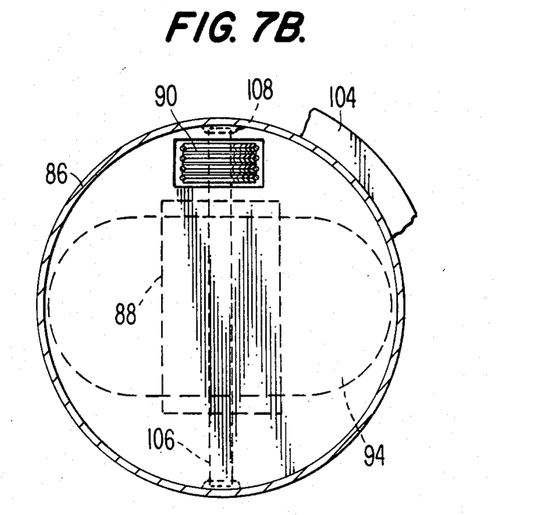
FIG. 7B is a sectional view, taken along line B—B' in FIG. 6, of the rear wheel and a portion of its steering/drive mechanism.

FIG. 6 is a side view of the rear wheel steering/drive mechanism of the vehicle shown in FIG. 3A; FIG. 7A is a top view of the rear wheel steering/drive mechanism of FIG. 6; and FIG. 7B is a sectional view, taken along line B-B' in FIG. 6, of the rear wheel and a portion of its steering/drive mechanism. In general, the drive mechanism for the rear wheel 92 and associated tire 94 of the vehicle 22 comprises an electric motor 80 driving a pulley 82, the pulley 82 being connected via a plurality of (preferably four) belts to a matching pulley 90 connected, via axle 106 (seated in bearing 108), to the wheel 92.

As mentioned previously, in the "monotube" mode, a flexible cable linkage (such as that shown by reference numeral 32a in FIG. 3A) between the vehicle drive motor and the wheels 36, 38 in the dolly mechanism operating in the monotube 12a (see FIG. 3A) propels the vehicle along the monotube 12a, the roadway drive wheel 92 being disengaged in this mode. In the "roadway" mode, the motor 80 (see FIG. 6) drives the drive wheel 92 via operation of the matching pulleys 82, 90 and associated belts 84 so as to propel the vehicle 22 along the roadway.

As also seen in FIGS. 6, 7A and 7B, the drive motor 80 and pulley 82 are mounted in an inner drum 86, the inner drum 86 being connected to the wheel 92 via a bracket 88. The inner drum 86 is contained within an outer drum 96, and a bearing assembly made up of bearing plate 100, bearing ring 102 and bearing flange 104 enables the entire unit (motor 80, pulley 82, inner drum 86, bracket 88, pulleys 82 and 90, wheel 92 and tire 94) to rotate through 360° within the outer drum 96. Thus, by means of appropriate linkage—specifically, by means of drum 142 (connected to steering wheel 44 via steering column 144), fairlead pulley 146, steering cable 148 and steering pulley 150 of FIG. 3B—to the steering wheel 44 in the driver's compartment, the drive unit 34 and rear wheel 92 of the vehicle 22 function as a steering mechanism for the vehicle 22. Since the elements shown in FIG. 6 can rotate through 360°, the steering mechanism of the vehicle can be used not only to steer the vehicle but also to reverse the direction of movement of the vehicle.

As further seen in FIGS. 6 and 7A, the inner drum 86 is mounted within an outer drum 96, rotation of the inner drum 86 within outer drum 96 being facilitated by bearing elements 100, 102 and 104 previously mentioned. In addition, a plurality of shock absorbers 98 is provided, each shock absorber 98 being connected at point 99 to the frame structure of the vehicle. Shock absorbers 98 are preferably six in number, as shown in FIG. 7A, and preferably have a travel of two inches. Shock absorbers 98 function to cushion the drive mechanism from jars associated with travel along roadways of varying contours and condition.

Operation of the "monotube" transportation system and of the dual-mode vehicles and freight vehicles thereon takes place as follows:.

(1) A vehicle arriving at a station on the system has its dolly mechanism raised into the "monotube" position, preferably by a crank operated by the vehicle driver or freight vehicle operator, and moves into the monotube, the four wheels 36, 38 (FIG. 3A) of the vehicle 22 engaging the flanged portions 52, 54 (FIG. 5) of the monotube 12a.

(2) The pick-up assembly 42 is engaged with the electric supply line 40 in the monotube 12a (FIG. 3A) so that power from central power generator 122 (FIG. 8) can be provided to the vehicle.

(3) The roadway drive wheels 92, 94 are disengaged from the motor 80 (FIG. 6), this being accomplished by operation of a clutch (not shown) which disengages the motor 80 from the pulley 82 or disengages the pulley 90 from the wheel 92.

(4) The vehicle operator inserts a magnetically coded routing/billing card into a vehicle control computer located at the station, each vehicle control computer being connected to a central control computer 120 (FIG. 8) which controls the system. Preferably, a fully automated system is employed whereby each vehicle has an identification element located on the vehicle (for example, on the side of the vehicle) so that each vehicle can be identified by scanning or monitoring units 25 (FIG. 1A) located at predetermined intervals throughout the system. In addition, the routing/billing card inserted into the vehicle control computer can be used to inform the central control computer 120 (FIG. 8) of the fact that a vehicle of certain identity is entering a given station. Moreover, the vehicle control computer at the station can be utilized to inform the central control computer 120 of the route to be taken on the system, or alternatively can be used to inform the central control computer 120 of the origin and destination stations, whereupon the central control computer 120 can determine the route to be taken by the vehicle.

(5) In addition, at the station of entry into the system, the vehicle's operating condition can be checked by utilization of an electronic sensor system, this being an optional feature of the system of the present invention.

(6) Once a vehicle is found to be in satisfactory operating condition, the operator engages a starter switch which causes the motor 32 (FIG. 3A) to be engaged with the wheels 36, 38 via the flexible cable drive 32a or other conventional means, and the vehicle begins its journey along the monotube 12a. Of course, if the vehicle is found to be not in perfect condition, it is removed from the monotube 12a and replaced with a satisfactory vehicle.

Figure 8:
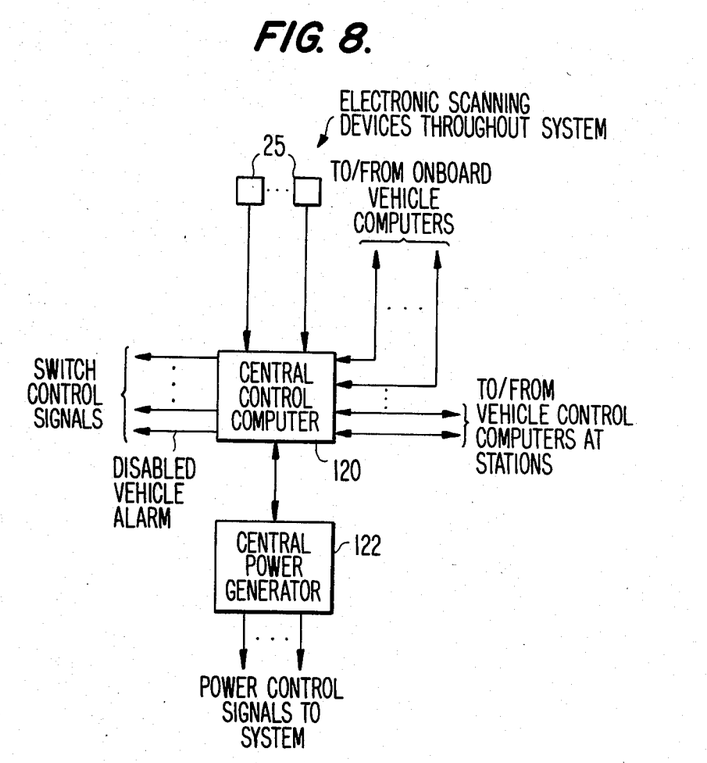
FIG. 8 is a diagrammatic representation of the computer-controlled system servicing and controlling the transportation system of the present invention.

All operations on the system of the present invention are, as indicated earlier, automatically controlled by electronic techniques and systems, such automatically controlled operations including: switching from one monotube to another (discussed earlier with reference to FIGS. 1A and 1B); merging into a main line of traffic (as also discussed earlier with reference to FIG. 1B); maintenance of distance intervals between adjacent vehicles in the traffic stream; and maintenance of speed of traffic. As previously mentioned, electronic scanning (or monitoring) units 25 (FIG. 1B) are mounted at predetermined intervals on the supports 24 serving the monotube 12a, such electronic scanning units 25 being connected to central control computer 120 (FIG. 8). As the vehicle 22 (FIG. 1A) passes each successive electronic scanning unit 25, the central control computer 120 (FIG. 8) is notified of the identity of the particular vehicle 22. This facilitates several control functions.

Further referring to FIGS. 1A and 8, by determining the time that it take the vehicle 22 to travel between successive electronic scanning units 25, the central control computer 120 can compute, based on the distance therebetween, the speed of the vehicle 22 on the system, thus receiving feedback information relative to the manner in which the speed of vehicles on the system is being maintained by the central control computer 120, the latter serving as an electronic controller of power generated by the central power generator 122.

In addition, by determining the time interval between a first vehicle's passing a given scanning unit 25 and a second vehicle's passing the same scanning unit 25, the central control computer 120 can compute, based on the known vehicle speed, the distance being maintained between successive vehicles, thus providing to the central control computer 120 feedback information relative to the distance between successive vehicles. If the vehicles are too close together for the vehicle speed being maintained, the central control computer 120 can cause the central power generator 122 to reduce power to the system, thus reducing vehicle speed and maintaining safety in the system.

Furthermore, if a given vehicle passes a first scanning unit 25, but does not pass the next successive scanning device 25 within a given period of time, the central control computer 120 determines, on this basis, that the vehicle 22 has become disabled at some point between the two successive scanning units. The central power generator 122 is then actuated to halt power transmission to the system, or at least to the portion of the system in which the vehicle 22 is disabled, and the central control computer 120 alerts a maintenance crew to move to the point of the disabled vehicle and attend to it. Alternatively, if a vehicle becomes disabled on the system, the power provided to the system, or at least to that portion of the system affected, is reduced so as to reduce the speed of vehicles following the disabled vehicle, and the vehicle immediately following the disabled vehicle can be moved into position so as to push the disabled vehicle to the next switching point, the central control computer 120 actuating the switch at that point so as to move the disabled vehicle onto an exit spur 20 (FIG. 1B) for eventual removal from the system for repair. In accordance with this latter manner of handling disabled vehicles, each vehicle 22 is preferably provided with front and rear bumpers specially designed for pushing another vehicle or being pushed by another vehicle in the case of disability of one of the vehicles.

When a vehicle enters the system at one of the stations, the vehicle control computer at that station notifies the central control computer 120 of the vehicle's entry into the system via an entrance spur 14 or 16 (FIG. 1B). The central control computer 120 then actuates the central power generator 122 so as to reduce the speed of traffic on the main monotube 12b; so that traffic entering the system via entrance spur 14 or 16 can be safely integrated into traffic on the main monotube 12b. Then, as the vehicle travels throughout the monotube system, and reaches various switching points, the central control computer 120 generates switch control signals so as to maintain the upcoming switch at the correct setting for that particular vehicle, based on the routing information originally entered into the computerized system by means of the vehicle control computer located at the station of entrance into the system.

As the vehicle approaches its destination station, the central control computer 120 generates a switch control signal so as to switch the vehicle onto an exit spur 18 or 20 (FIG. 1B), thus directing the vehicle to the station of destination. At the destination station, the vehicle is "logged off" the system by means of information entered into the vehicle control computer at that station. At the same time, in a preferred embodiment, billing information is computed by the central control computer 120, and is transmitted to the vehicle control computer at the destination station so that the operator of the vehicle receives an immediate assessment of the cost of traveling on the system. Finally, it should be noted that, as vehicles are directed onto exit spurs 18 or 20 (FIG. 1B), thus reducing the amount of traffic remaining on the main monotube 12b, the central control computer 120 actuates the central power generator 122 to generate more power to that portion of the system so as to increase the speed of travel of the vehicles remaining on the main monotube 12b.

It should be noted that, as an alternative to the techniques described above, each vehicle could be provided with an on-board vehicle computer communicating with the central control computer 120 by radio, by electric lines (such as the electric supply line 40 of the monotube), or by other conventional means. This communication/computing capability could be used to assist the central control computer 120 in monitoring and controlling the progress of vehicles traveling the system.

As mentioned earlier, mail or package freight modules are driverless, but otherwise operate over the system between stations or freight terminals in an automatic manner, as described above.

An advantage of the presently disclosed system resides in the fact that its operational concept lends itself readily to promotion of vehicle leasing as opposed to vehicle purchase, and preferably all vehicles on the system are leased to the user. This enables vehicles to be exchanged easily among system users, thus maintaining a uniformly high quality of operating condition of all vehicles traveling on the system.

With respect to identification of vehicles and the detection of vehicle identity by means of the electronic scanning devices 25 (FIG. 1A), any conventional means for vehicle identification and for identifying individual vehicles can be employed on the system. For example, vehicle identification numbers can be displayed by means of a bar code inscribed on the side of each vehicle, and the electronic scanning unit 25 can comprise a conventional bar code scanner.

Figure 9A:
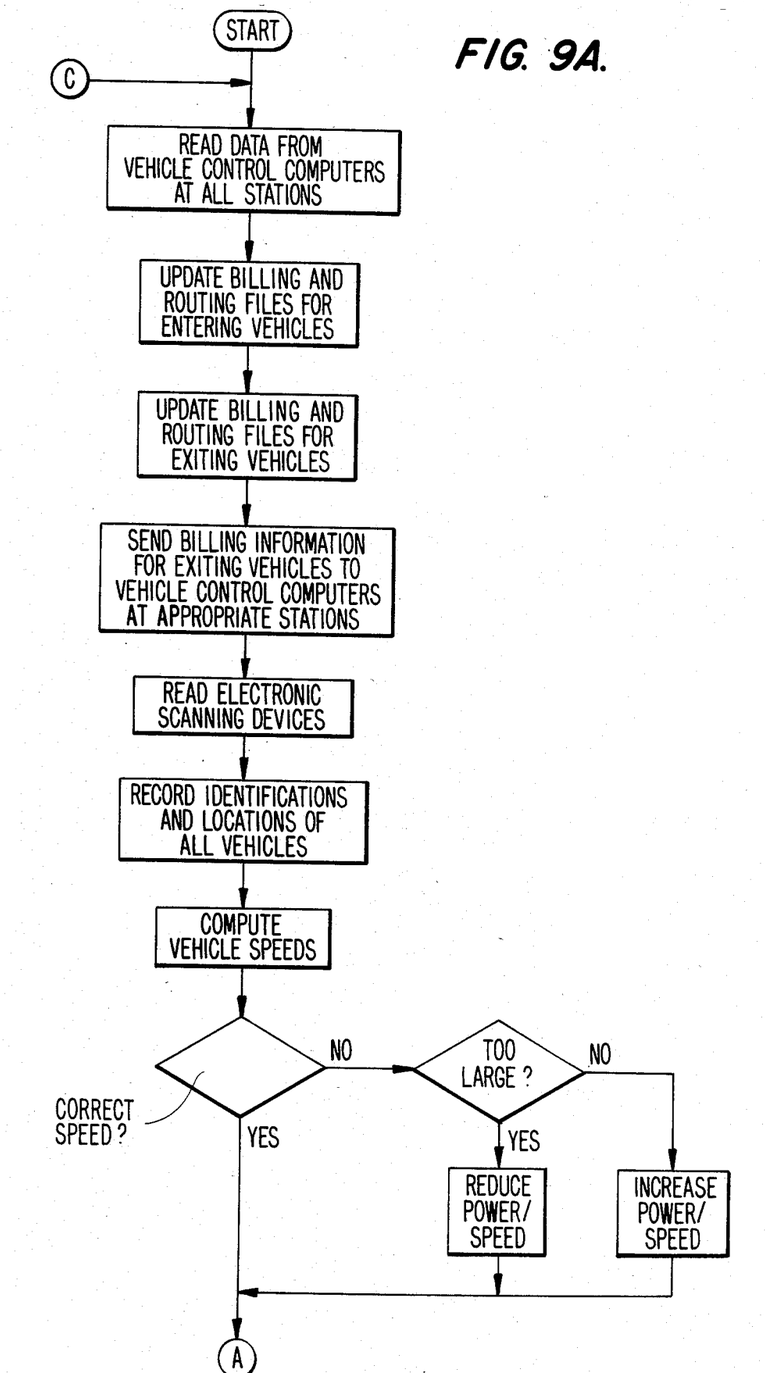
FIGS. 9A-9C are flowcharts of the software-controlled operations implemented by the central processing unit of the system of FIG. 8.
Figure 9B:
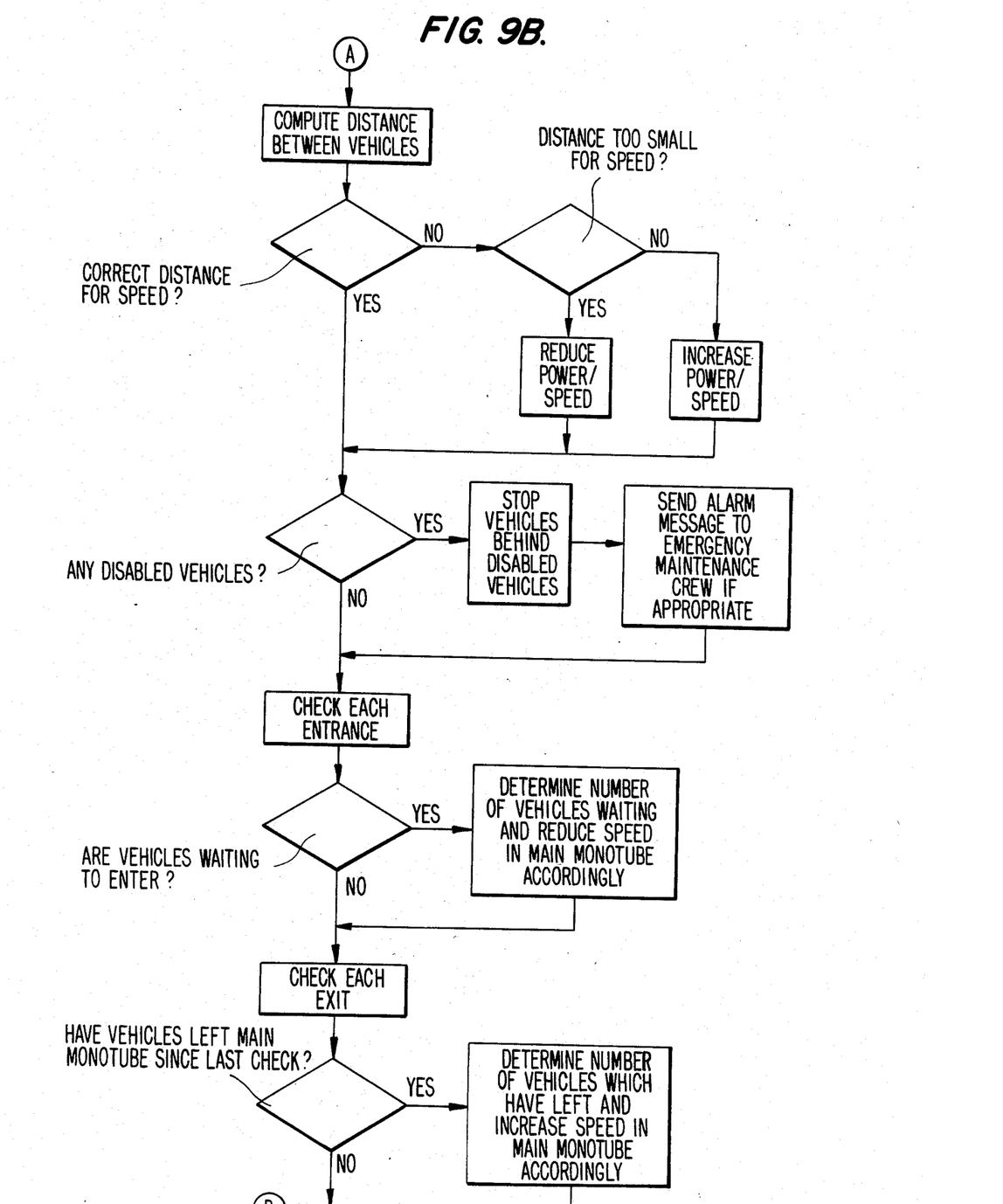
Figure 9C:
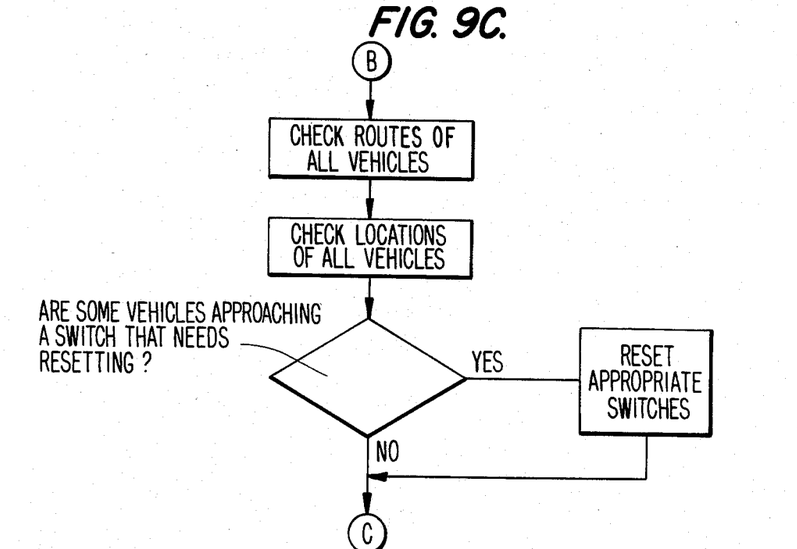

FIGS. 9A–9C are flowcharts of the operations performed by the programmed central control computer 120 of FIG. 8. Since the flowcharts are self-explanatory in nature, and since the content of the flowcharts has already been discussed above, no further discussion is believed to be necessary, except to say that the flowcharts enable any programmer of ordinary skill in the art to appropriately program the central control computer 120, as well as the vehicle control computers at the individual stations, to carry out the functions described above and described in the flowcharts.

While preferred forms and arrangements have been shown in illustrating the invention, it is to be understood that various changes and modifications may be made without departing from the spirit and scope of this disclosure. For example, it should be understood that the vehicle shown in FIGS. 3A, 3B, 4–6, 7A and 7B is presented as a typical model of the most efficient vehicle for use on the inventive system, but the subject invention should not be construed as being limited to that particular vehicle. That is to say, other vehicle designs may also be used on the inventive system provided that they have the following characteristics: (1) a gross weight which falls within specified limits, which limits permit the vehicle to be suspended from the monotube by a dolly carried by the vehicle itself; (2) the capability of mounting a retractable dolly on the roof of the vehicle; (3) a power take-off capability sufficient to drive the wheels of the dolly along the monotube; and (4) a capability of being controlled for starting, stopping, switching, and speed maintenance by a computer compatible with the computerized control system of the present invention.

I claim:

1. A dual-mode transportation system comprising a guideway and a dual-mode vehicle having a first mode of operation in which said dual-mode vehicle travels along said guideway, said dual-mode vehicle having a second mode of operation on which said dual-mode vehicle travels along a roadway;

wherein said dual-mode vehicle carries its own engaging means for engaging said guideway when the dual-mode vehicle is operating in the first mode of operation; and wherein said engaging means comprises a retractable dolly which is retracted when said dual-mode vehicle is not operating in the first mode of operation, said dual-mode vehicle comprising a roof having a surface and recess means located adjacent to said surface for receiving said retractable dolly when said retractable dolly is retracted, said retractable dolly extending from said recess means when said engaging means engages said guideway.

2. The system of claim 1, wherein said retractable dolly comprises at least one pair of wheels and at least one strut connecting said at least one pair of wheels to a frame member of said dual-mode vehicle, said guideway comprising a monotube having a pair of flanged portions, each of said flanged portions extending in a direction corresponding to a direction of travel of said dual-mode vehicle, each of said flanged portions carrying a respective one of said at least one pair of wheels during travel of the dual-mode vehicle on said guideway.

3. The system of claim 2, wherein said at least one pair of wheels comprises a forward pair of wheels and a pair of wheels, said retractable dolly further comprising at least one longitudinal beam connecting said forward pair of wheels to said rear pair of wheels.

4. The system of claim 3, wherein said at least one strut comprises two elements having first ends hinged to each other, one of said two elements having a second end connected to said at least one longitudinal beam, the other of said two elements having a second end connected to said frame member of said dual-mode vehicle.

5. The system of claim 1, wherein said dual-mode vehicle comprises a wheel and motor means mechanically connected to said wheel for rotatably driving said wheel so as to convey said dual-mode vehicle along said raodway in said second mode of operation, said dual-mode vehicle further comprising rotating means for rotating said wheel and said motor means in a plane of rotation which is parallel to said roadway, thereby redirecting said dual-mode vehicle in a different direction along said roadway.

6. The system of claim 5, wherein said rotating means is capable of rotating said wheel and said drive means by 360°, thereby reversing the direction of movement of said dual-mode vehicle along said roadway in said second mode of operation.

7. The system of claim 1, wherein said retractable dolly comprises at least one pair of wheels, at least one strut connecting said at least one pair of wheels to said dual-mode vehicle, and collapsing means located at a point on said at least one strut for collapsing said at least one strut when said dual-mode vehicle operates on said roadway in said second mode of operation, thereby retracting said retractable dolly into said recess means.

8. The system of claim 7, wherein said strut comprises two sections and said collapsing means comprises a hinge joint located at a point between said two sections.

9. A dual-mode transportation system comprising a guideway and a dual-mode vehicle having a first mode of operation in which said dual-mode vehicle travels along said guideway, said dual-mode vehicle having a second mode of operation in which said dual-mode vehicle travels along a roadway;

wherein said dual-mode vehicle carries its own engaging means for engaging said guideway when the dual-mode vehicle is operating in the first mode of operation;

wherein said engaging means comprises a retractable assembly which is retracted when said dual-mode vehicle is not operating in the first mode of operation, said dual-mode vehicle comprising a roof having a surface and recess means located adjacent to said surface for receiving said retractable assembly when said retractable assembly is retracted, said retractable assembly extending from said recess means when said engaging means engages said guideway;

wherein said guideway includes an electric supply line enclosed within said guideway for supplying electric power to said dual-mode vehicle during operation in said first mode of operation, said dual-mode vehicle comprising pick-up means carried by said engaging means and connecting said dual-mode vehicle to said electric supply line for conducting electric power from said electric supply line to said dual-mode vehicle.

10. The system of claim 9, wherein said engaging means comprises at least one pair of wheels which travel along said guideway when said dual-mode vehicle is in said first mode of operation, said dual-mode vehicle further comprising motor means electrically connected to said pick-up means for receiving said electric power from said pick-up means, said motor means being mechanically connected to said at least one pair of wheels and responsive to said electric power for driving said at least one pair of wheels, thereby conveying said at least one pair of wheels along said guideway during operation in said first mode of operation.

11. The system of claim 9, wherein said dual-mode vehicle comprises battery means for providing power to operate said dual-mode vehicle in said second mode of operation, said battery means being electrically connected to said pick-up means so as to receive electric power therefrom, said battery means thereby recharging during operation of said dual-mode vehicle in said first mode of operation.

12. The system of claim 9, wherein said guideway comprises a monotube and said electric supply line is enclosed within said monotube, said engaging means comprising at least a forward wheel and a rear wheel movable within said monotube, said engaging means further comprising a longitudinal beam interconnecting said forward wheel and said rear wheel, said pick-up means comprising a pick-up wire disposed on said longitudinal beam and extending into said monotube for contacting said electric supply line within said monotube.

13. In a transportation system comprising a guideway and a vehicle having at least one mode of operation for traveling along said guideway;

the improvement wherein said vehicle carries its own engaging means for engaging said guideway, said guideway comprising a monotube suspended in the air, said engaging means comprising a dolly having at least one pair of wheels, said monotube having first and second flanged portions which support respective wheels of said at least one pair of wheels as the vehicle travels along said guideway; and wherein said dooly comprises a retractable assembly which is retracted when said vehicle is not in use on said guideway, said vehicle comprising a roof having a surface and recess means located adjacent to said surface for receiving said retractable assembly when said retractable assembly is retracted, said retractable assebly ectending from said recess means when said engaging means engages guideway.

14. In the system of claim 13, wherein said retractable assembly comprises a forward pair of wheels, a rear pair of wheels, and at least one longitudinal beam connecting said forward pair of wheels to said rear pair of wheels.

15. In the system of claim 13, wherein said retractable assembly further comprises at least one strut for connecting said at least one pair of wheels to a frame member of said vehicle, said at least one strut comprising two retractable elements having first ends hinged together, one of said two retractable elements having a second end connected to said at least one pair of wheels, the other of said two retractable elements having a second end connected to said frame member of said vehicle.

16. In the system of claim 13, wherein said vehicle comprises pick-up means for contacting an electric supply line in said guideway, said electric supply line providing electric power via said pick-up means to said vehicle.

17. In the system of claim 16, said vehicle comprising motor means electrically connected to said pick-up means for receiving said electric power from said electric supply line, said motor means being mechanically connected to said at least one pair of wheels and being responsive to said electric power from said electric supply line for driving said at least one pair of wheels to move said vehicle along said guideway.

18. In the system of claim 16, said retractable assembly comprising a forward pair of wheels, a rear pair of wheels, and at least longitudinal beam connecting said forward pair of wheels to said rear pair of wheels, said pick-up means comprising at least one flexible pick-up element connected to said at least one longitudinal beam and extending to said electric supply line.

19. The system of claim 13, wherein said retractable assembly comprises at least one strut connecting said at least one pair of wheels to said vehicle, and collapsing means located at a point on said at least one strut for collapsing said at least one strut when said vehicle operates on said roadway, thereby retracting said retractable assembly into said recess means.

20. The system of claim 19, wherein said at least one strut comprises two sections and said collapsing means comprises a hinged joint located at a point between said two sections.

* * * * *